Figure 1:
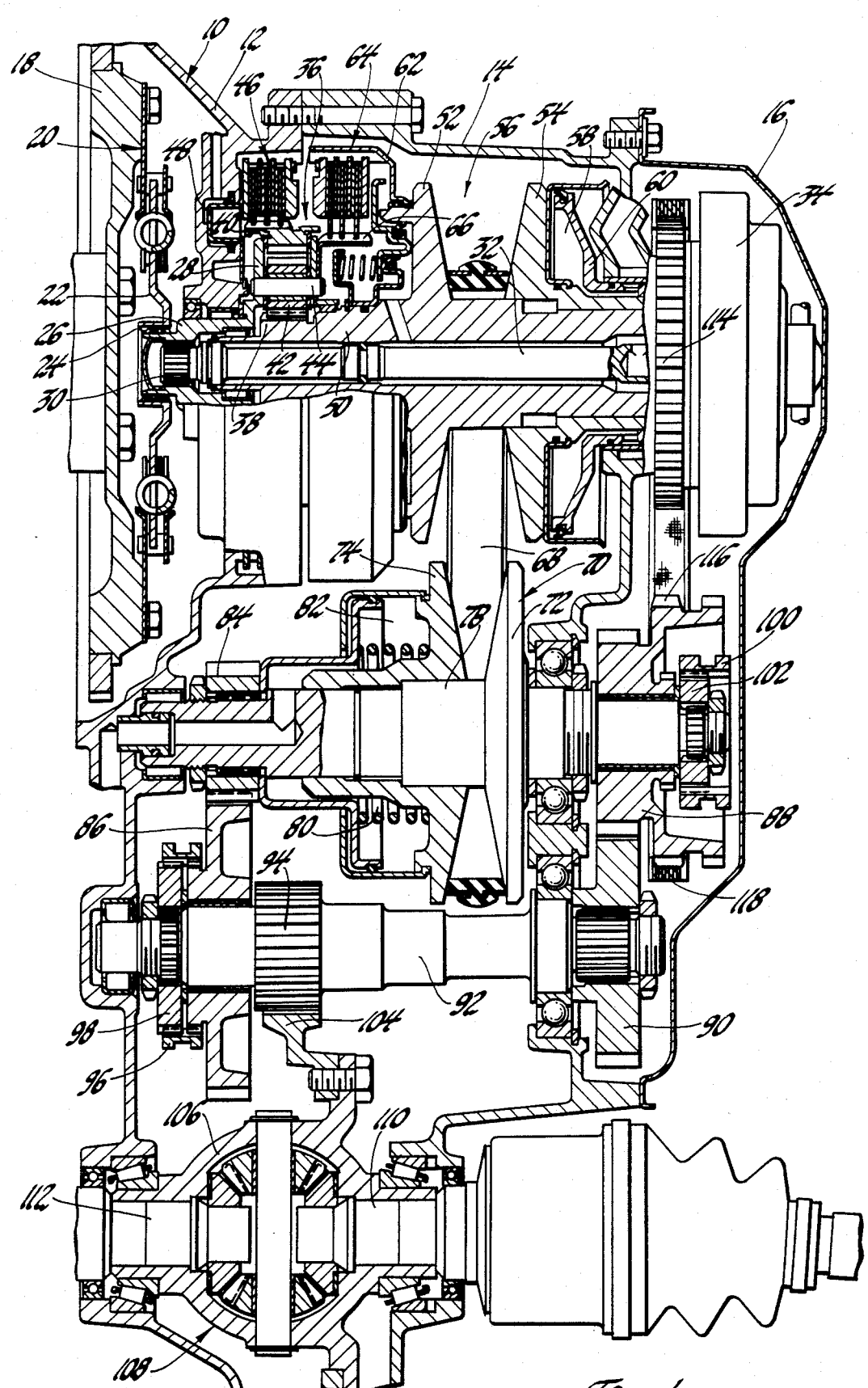

United States Patent [19]

Koivunen

[11] Patent Number: 4,608,885
[45] Date of Patent: Sep. 2, 1986

[54] MULTI-RANGE CONTINUOUSLY VARIABLE POWER TRANSMISSION

[75] Inventor: Erkki A. Koivunen, Livonia, Mich.

[73] Assignee: General Motors Corporation, Detroit, Mich.

[21] Appl. No.: 530,548

[22] Filed: Sep. 9, 1983

[51] Int. Cl.⁴ .............................................. F16H 37/00
[52] U.S. Cl. ........................................ 74/689; 74/740; 74/665 GE
[58] Field of Search ............. 74/665 F, 665 GE, 740, 74/689, 694, 695, 764, 336 B; 474/72

[56] References Cited

U.S. PATENT DOCUMENTS

| | | | |
|---|---|---|---|
| 3,011,353 | 12/1961 | Friedrich et al. | 474/72 |
| 3,354,748 | 11/1967 | Chapman | 74/689 |
| 3,442,346 | 5/1969 | Winter et al. | 474/72 |
| 3,850,050 | 11/1974 | Lemmens | 74/689 |
| 3,924,480 | 12/1975 | Carapellucci | 74/689 |
| 4,304,150 | 12/1981 | Lupo et al. | 474/72 |
| 4,392,394 | 7/1983 | Hofbauer et al. | 74/689 |
| 4,458,558 | 7/1984 | Frank | 74/665 GE |
| 4,458,559 | 7/1984 | Croswhite et al. | 74/665 GE |
| 4,467,669 | 8/1984 | Kawamoto | 74/689 |
| 4,467,670 | 8/1984 | Kawamoto | 474/72 |
| 4,502,352 | 3/1985 | Svab | 74/689 |

FOREIGN PATENT DOCUMENTS

| | | | |
|---|---|---|---|
| 2093133 | 8/1982 | European Pat. Off. | 74/740 |
| 2115091 | 9/1983 | European Pat. Off. | 74/689 |

Primary Examiner—Lawrence Staab
Assistant Examiner—David A. Novais
Attorney, Agent, or Firm—Donald F. Scherer

[57] ABSTRACT

A power transmission combines a continuously variable belt drive in series relation with a multi-ratio gear arrangement between the transmission input and output shafts. The gear arrangement can be selectively changed between low and high ratios. In each gear ratio, the belt drive ratio is controlled from an underdrive ratio to an overdrive ratio to thereby provide two continuously variable drive ranges to effect an increase in output speed. A selectively operable transition clutch, controlling a chain drive disposed in parallel with the belt and gear drives, is provided to maintain power transmission between the input and output shafts during a ratio change in the gear arrangement while the belt drive ratio is changed from overdrive to underdrive.

2 Claims, 2 Drawing Figures

MULTI-RANGE CONTINUOUSLY VARIABLE POWER TRANSMISSION

This invention relates to power transmissions and more particularly to such transmissions having a continuously variable range of drive ratios.

It is an object of this invention to provide an improved continuously variable power transmission wherein selectively operable multiple gear ratios are disposed in series drive relation with the variable ratio range belt drive and wherein a transition clutch is provided to maintain vehicle power transmission during a step ratio change between gear ratios while the belt drive ratio is changed from one end of the ratio range to the other end.

It is another object of this invention to provide an improved continuously variable power transmission wherein a transition clutch is selectively operable to control a chain drive for power transfer in parallel with a belt drive of a variable transmission whereby the belt drive ratio can be changed simultaneously with a gear ratio interchange without the interruption of power flow during the ratio change.

It is a further object of this invention to provide an improved continuously variable power transmission wherein a selectively operable transition clutch is utilized to control a chain drive disposed in parallel drive relationship with a belt drive and multi-gear ratio arrangement of the variable transmission such that the belt drive ratio and the gear ratios can be changed while speed synchronization is maintained by the chain drive.

Figure 2:
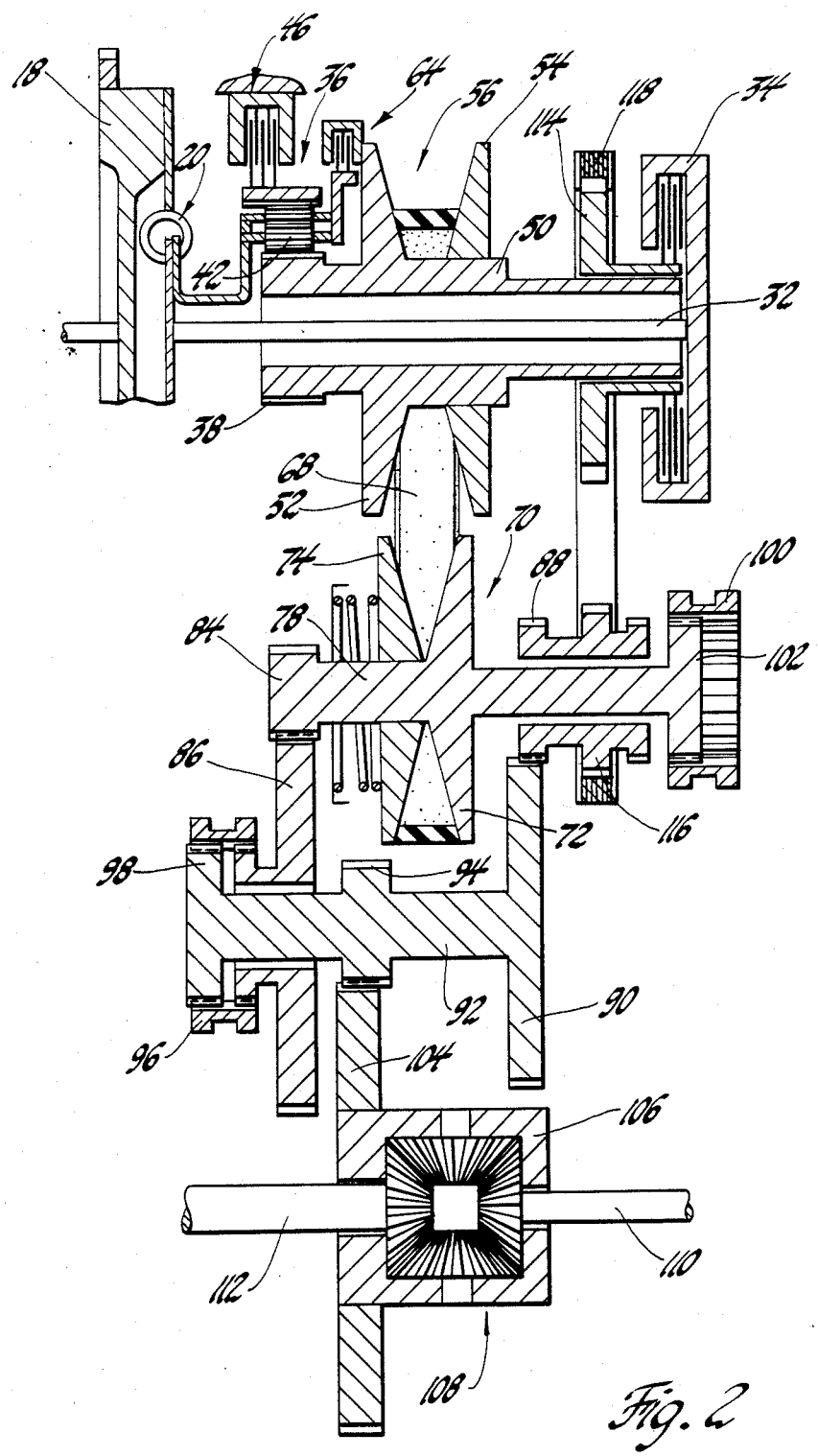

These and other objects and advantages of the present invention will be more apparent from the following specification and drawings in which:

FIG. 1 is an elevational view, partly in section, of a transmission incorporating the present invention; and FIG. 2 is a diagrammatic representation of the transmission shown in FIG. 1.

Referring to the drawings, wherein like characters represent the same or corresponding parts throughout the several views, there is seen in FIG. 1, a transmission having a multi-piece housing 10 which includes an engine mounted portion 12, a transmission enclosing portion 14 and an end cover 16.

An engine flywheel 18 is disposed within the engine mounted portion 12 and is adapted to be connected to an internal combustion engine in a wellknown manner. The flywheel 18 has drivingly connected thereto a vibration damper mechanism 20 which includes an inner hub 22 having a spline portion 24 formed thereon. The spline portion 24 is drivingly connected with an input sleeve shaft 26 which is formed integrally with or otherwise connected to a planetary carrier 28.

The input sleeve shaft 26 also has a splined inner diameter 30 to which is drivingly connected a transition clutch input shaft 32 which in turn is drivingly connected to a conventional fluid operated friction clutch 34 which is hereinafter designated as a transition clutch.

The planet carrier 28 is a component of a compound planetary gear set generally designated 36. The planetary gear set 36 also includes a sun gear 38, a ring gear 40 and a plurality of pinions 42 rotatably mounted on pins 44 secured in the carrier 28. A portion of the pinions 42 mesh with both the sun gear 38 and the remainder of the pinions 42. These remaining pinions 42 mesh with the ring gear 40. Such planetary gear sets are wellknown in the art. Those familiar with planetary gear sets will recognize that when the ring gear 40 is held stationary, the sun gear 38 will rotate opposite to the carrier 28, so that a reverse drive connection is provided when the carrier is driven.

To hold the ring gear 40 stationary, there is provided a conventional fluid operated friction brake 46 which is controlled in operation by a hydraulic piston 48 slidably disposed in portion 12. The sun gear 38 is formed integrally with or otherwise secured to a shaft 50 which has formed thereon a pulley half 52. A second pulley half 54 is slidably disposed on the shaft 50 and cooperates with pulley half 52 to form an input pulley, generally designated 56.

The pulley half 54 is controlled for sliding movement along shaft 50 by providing fluid pressure within a chamber 58 formed by the pulley half 54 and a wall member 60. The pulley half 52 has drivingly connected therewith a hub or drum 62 which is a member of a forward clutch 64 which is a conventional fluid operated friction type clutch. The clutch 64 has an input hub 66 which is drivingly connected with the carrier 28 such that when clutch 64 is engaged, the pulley 56 will rotate in the same direction as the input shaft 26. When the brake 46 is engaged, the pulley 56 will rotate in the opposite direction of the input shaft 26.

The pulley 56 is in a frictional drive relationship with a belt 68 which also frictionally engages an output pulley, generally designated 70. The output pulley has a fixed pulley half 72 and a movable pulley half 74. The movable pulley half 74 is slidably disposed on a shaft 78 which is integral with or otherwise secured to pulley half 72.

The pulley half 74 is urged toward the pulley half 72 by a compression spring 80 and controlled fluid pressure which is maintained in a chamber 82. The operation of the pulleys 56 and 70 and the belt 68 is well-known. Such devices are utilized to provide a variable ratio drive mechanism. The pulleys 56 and 70, as shown, are in an underdrive relationship.

To change the ratio through a predetermined range toward an overdrive relationship, the pressure in chamber 58 is increased such that pulley 54 will move toward pulley half 52 and the belt 68 will be moved outward. The outward movement of belt 68 in pulley 56 will cause inward movement of the belt 68 in pulley 70. This inward movement of belt 68 is accommodated by movement of the pulley half 74.

When the belt 68 is disposed at the outermost drive diameter of pulley 56 and the innermost diameter of pulley 70, the maximum available overdrive relationship is established. The pulley drive ratio can be controlled within a range of ratios between the underdrive and overdrive ratio. This is accomplished by maintaining the control pressure in chamber 58 at a desired level in a well-known manner.

The shaft 78 has drivingly connected thereto a gear 84 which is in constant mesh with a gear 86. These gears 84 and 86 provide a low gear ratio. Rotatably mounted on the shaft 78 is a gear 88 which meshes with a gear 90. These two gears 88 and 90 provide a high gear ratio. The gear 86 is rotatably supported on a transmission output shaft 92 which has integrally formed therewith or otherwise secured thereto a gear member 94.

The gear 86 is selectively coupled to the output shaft 92 through a mechanical clutch 96 which is adapted to bridge gear 86 to a hub 98 which is drivingly connected to the shaft 92. The mechanical clutch 96 is a wellknown structure such that a detailed description is not considered necessary. To disengage gear 86 from shaft 92, the clutch 96 is moved leftward.

The gear 88 is connectible through a mechanical clutch 100 and a hub 102 with the shaft 78. To connect the gear 88 to the output shaft 92 through gear 90, the mechanical clutch 100 is moved to the left. Since the low and high gear ratios are distinct they cannot be simultaneously connected with the output shaft 92, therefore, the mechanical clutches 96 and 100 cannot be simultaneously engaged.

The gear 94 on output shaft 92 meshes with a ring gear 104 which is secured to a casing 106 of a conventional bevel gear differential designated 108. The differential 108 has two output shafts 110 and 112 which are adapted to be drivingly connected to the wheels of a vehicle, not shown.

The transition clutch 34 has secured thereto a gear or sprocket member 114. A second gear or sprocket member 116 is formed integrally with or otherwise secured to the gear 88. The sprockets 114 and 116 are interconnected by a conventional toothed chain 118. Thus, whenever the transition clutch 34 is engaged, the input shaft 26 is connected directly to the output shaft 92 through sprocket 114, chain 118, sprocket 116, gear 88 and gear 90.

For a description of the operation of the transmission, the diagrammatic representation of FIG. 2 will now be referred to. The transmission elements most directly related to the operation of the transmission are given the same numerical designation in FIG. 2 as they have in FIG. 1.

With the vehicle, not shown, sitting at rest, and the flywheel 18 being driven by the engine, not shown, the pulley 56 is controlled to establish the maximum underdrive ratio within the belt drive. The mechanical clutch 96 is engaged to provide the low gear ratio between the belt drive and the differential gear arrangement 108. The mechanical clutch 100 is disengaged. Also disengaged is the friction brake 46, the forward clutch 64 and the transition clutch 34.

To start the vehicle moving in a forward direction, the forward clutch 64 is brought into control engagement. After the clutch 64 is fully engaged, the vehicle output speed can be increased by increasing the engine speed, if desired, or by changing the ratio in the belt drive structure. Generally, the engine will be controlled to operate at its best fuel economy or performance setting depending upon the operator. Transmission output speed and therefore vehicle speed will be controlled through the manipulation of the belt drive ratio.

When the belt drive is manipulated to provide the maximum overdrive ratio, there will be speed synchronization between the chain drive through sprockets 114 and 116, gears 88 and 90 and the belt drive through gears 84 and 86. Thus, when the transition clutch 34 is engaged to control the power transmission, the output speed of the transmission will be unchanged.

After the transition clutch 34 is engaged, the mechanical clutch 96 can be disengaged and the ratio in the belt drive can be reduced from the maximum overdrive ratio to the maximum underdrive ratio. At the maximum underdrive ratio, there is speed synchronization speed, further vehicle speed increase can be obtained by controlling the belt drive ratio from the maximum underdrive to the maximum overdrive.

To decrease overall transmission ratio, the reverse of the above described ratio increase is undertaken. The belt drive ratio is decreased from maximum overdrive to maximum underdrive at which time speed synchronization of the transition clutch 34 and shaft 92 is attained. At this point, the transition clutch 34 is engaged, the mechanical clutch 100 is disengaged and the belt drive ratio is increased from maximum underdrive to maximum overdrive. At the maximum overdrive ratio, there is speed synchronization for the engagement of mechanical clutch 96 thereby placing the gear arrangement in the low ratio condition. After engagement of mechanical clutch 96, the transition clutch 34 can be disengaged and further transmission ratio decrease can be obtained by reducing the drive ratio of the belt drive from maximum overdrive to maximum underdrive.

A reverse drive is obtained by disengaging clutch 64 and engaging brake 46 while the belt drive is maintained at its maximum underdrive ratio. With the preferred embodiment shown, the transition clutch 34 is not used during reverse operation. Most vehicle operations do not require high speed reverse. Should a high speed reverse be desirable, it is possible to operate the transition clutch 34 in both a forward and reverse direction through the use of either a second planetary gear set or by providing a drive connection between sun gear 38 and the input to the transition clutch 34. Those familiar with the art of power transmissions will recognize the manner in which these simple changes can be made.

In the above described embodiment, clutch 64 and brake 46 are used as starting clutches. Those skilled in the art, however, will recognize that a fluid coupling or a clutch can be disposed between the input shaft and the flywheel and used as a starting device; while clutch 64 and brake 46 are used only to establish forward and reverse driving modes.

Obviously, many modifications and variations of the present invention are possible in light of the above teaching. It is therefore to be understood, that within the scope of the appended claims, the invention may be practiced otherwise than as specically described.

The embodiments of the invention in which an exclusive property or privilege is claimed are defined as follows:

1. A continuously variable power transmission for a vehicle comprising: input means for receiving input drive; output means for delivering a drive; multi-ratio gear means drivingly connected with the output means; variable ratio and pulley belt means having a first adjustable pulley connected to the input means and a second adjustable pulley; first clutch means selectively connecting the second adjustable pulley to said output means through one gear ratio of said multi-ratio gear means; second clutch means for selectively connecting said second adjustable pulley to said output means through another gear ratio of said multi-ratio gear means; and transition clutch means for selectively connecting said input means to said output means during to an underdrive ratio during increasing output speeds when the transition clutch is engaged.

2. A continuously variable power transmission for a vehicle comprising: input means for receiving input drive; output means for delivering a drive; gear means having a low gear ratio and a high gear ratio drivingly connected with the output means; variable ratio and pulley belt means having a first adjustable pulley connected to the input means and a second adjustable pulley; first mechanical clutch means selectively connecting the second adjustable pulley to said output means through said low gear ratio of said gear means; second mechanical clutch means for selectively connecting said second adjustable pulley to said output means through said high gear ratio of said gear means; chain drive means drivingly connected to said output means through said high gear ratio; and selectively engageable transition clutch means for selectively connecting said input means to said chain drive means during the interchange of said first and second mechanical clutch means, said variable ratio pulley and belt means being selectively controlled from an underdrive ratio to an overdrive ratio during an output speed increase when either of said first clutch means or said second clutch means is engaged, and being controlled from an overdrive ratio to an underdrive ratio during increasing output speeds when the transistion clutch is engaged and the first and second mechanical clutch means are disengaged.

* * * * *